United States Patent Office 2,948,632
Patented Aug. 9, 1960

2,948,632

SURFACE MODIFIED KAOLIN CLAY

Charles Gerald Albert, Basking Ridge, and James R. Wilcox, Westfield, N.J., assignors to Minerals & Chemicals Corporation of America, Menlo Park, N.J., a corporation of Maryland No Drawing. Filed Apr. 24, 1958, Ser. No. 730,550

7 Claims. (Cl. 106—308)

The instant invention relates to kaolin clay modified as to its surface characteristics thereby to enhance the utility of the clay in a variety of applications. The invention relates also to compositions in which said modified kaolin clay is dispersed in an organic liquid, particularly a liquid useful in preparing a coating composition.

"Kaolin clay" or "kaolin" is a term used to describe several hydrated aluminosilicate minerals, generally of platelike structure, and comprising as species: kaolinite, nacrite, halloysite and dickite. Kaolinitic minerals are described by the general formula $Al_2O_3.2SiO_2.XH_2O$, in which X is usually 2. The weight ratio of $SiO_2$ to $Al_2O_3$ indicated by this formula is 1.18 and kaolin clays normally possess $SiO_2/Al_2O_3$ ratios of from 1.0 to 1.5. Kaolin differs from other clay minerals not only in composition and lattice orientation but also in base-exchange value, the base-exchange value of kaolinitic clays ordinarily ranging from about 3 to 15 milliequivalents per 100 grams. Montmorillonite minerals, another group of clay minerals, have base-exchange values considerably higher, usually within the range of from about 60 to 100 milliequivalents per 100 grams.

Kaolin has been widely used in coating compositions as a filler or extender pigment. However, in some systems, notably liquid organic systems, the utility of kaolin clay is seriously impaired by the poor wettability of the clay by the organic liquid and poor dispersibility of the clay in said liquid. When dispersed in polar liquids, kaolin clay tends to body the liquid to produce a thixotropic composition, this being caused by the monolayer of adsorbed water on the surface of the clay particles. Although such bodying is desirable in certain applications, as in the preparation of silk screen inks, it is a very serious disadvantage when a flowable system is desired. In a flowable system wherein a nonpolar organic fluid is the continuous phase, kaolin clay can be used in small quantity only without producing excessive viscosity in the composition and cannot be used as an extender in effective quantities. Although kaolin clay may be dispersed in polar organic liquids without excessive bodying effects, nevertheless the ease of dispersion and stability of the suspension leave much to be desired. Furthermore, clay-polar organic liquid compositions are prone to emulsification in the presence of environmental moisture. For example, lithographic inks formulated with kaolin clay in conventional lithographic vehicles tend to emulsify, this seriously impairing the quality of the print produced by the formulation.

Accordingly, it is an object of our invention to modify the surface characteristics of kaolin clay thereby to improve its wettability and dispersibility in organic liquid media.

Another object of our invention is to promote the hydrophobicity of kaolin clay by modifying the surface thereof whereby the disadvantages inherent in the hydrophilic surface characteristics of unmodified clay are obviated.

Another object of our invention is to provide useful coating compositions in which surface modified kaolin clay is dispersed in an organic fluid and in which the advantages of surface modification of the clay are manifest.

Further objects of the invention will be readily apparent from a description of our invention which follows.

We have discovered that kaolin clay is beneficially modified by coating a small quantity of rosin amine stearate on individual platelets thereof. The clay thus modified has utility in a variety of compositions comprising an organic liquid as the continuous phase and the performance characteristics of the coated clay therein surpass that of kaolin clay, unmodified. We find that rosin amine stearate coated kaolin is readily wet by and is dispersible in a variety of organic fluids, polar and nonpolar, and that the suspendibility therein surpasses by far that of the unmodified clay or the unmodified clay in the presence of rosin amine stearate dissolved in the vehicle. Furthermore, we find that the modified clay may be dispersed in relatively large quantities in polar and nonpolar vehicles without producing excessive bodying or gel formation whereby the clay may be used as a major pigment in a coating composition utilizing an organic liquid. Another outstanding property of the modified kaolin clay of our invention is that said modified kaolin clay of our invention is that said modified clay may be used in nonpolar organic vehicles without emulsification resulting when the composition is subjected to moisture. Accordingly, our novel modified clay has outstanding utility in lithographic ink compositions.

The rosin amine stearate coating on the kaolin clay is essentially chemically stable and permanent and is not readily displaced from the surface by water or other molecules nor dissolved off the surface by the solvent action of the vehicle.

We are aware that certain clays, specifically clays with high base-exchange capacity such as montmorillonite clays, have been base-exchanged with certain high molecular weight amines and certain amine salts. The provision of such chemically reacted clays is the subject of U.S. Patent No. 2,531,427 to Hauser. When such clays are dispersed in organic liquids, particularly nonpolar organic liquids, they swell and produce gels therein. Accordingly, these onium reacted clays are useful in bodied coating compositions, as extenders for the principal pigment in the case of flowable coating compositions. U.S. 2,739,069 to Ratcliffe relates to onium reacted high base-exchange capacity clays in printing ink compositions, such organic modified clay being useful as suspending agents for the major pigments. Such prior art modified clays are useful in ink formulations in low loadings, ordinarily in an amount not in excess of about 4%, based on the weight of the compositions.

Such organophilic clays differ substantially from the coated clays of our invention both in composition and properties. The onium reacted clays are essentially hydrophobic and highly organophilic whereas the coated clay of our invention has only partial hydrophobic properties, as will be shown hereinafter. Furthermore, the presence of the fatty acid residue, the stearate group, is thought to profoundly effect the rheological properties of the coated clay within the compass of our invention.

More specifically, in accordance with our invention, we modify kaolin clay in particulate form by coating the surface thereof with a small quantity of rosin amine stearate. Ordinarily, we employ rosin amine stearate in amount within the range of 1 to 2%, based on the weight of the clay, although some benefits are realized when the rosin amine stearate is used in amount within the range of from 0.50 to 5.0%, based on the weight of the clay. When the rosin amine stearate is employed in amount less than about 0.50% we find that the improvement in wettability by and dispersibility in organic media is minimal, whereas when the coating is added in amounts in excess of about 2.0% lttle improvement in hydrophobicity or performance results from increment in coating content. We find that the measured surface hydrophobicity is not increased substantially when the percentage of rosin amine stearate coating is increased to levels beyond 1% by weight. However, in certain instances, such as in use as an extender in lithographic inks, some improvement in performance will result by employing rosin amine stearate coatings in excess of 1%.

We may use the stearate of an amine derived from any rosin, although we prefer to use the stearate salt of disproportionated rosin amine, such as so-called "Rosin Amine D." The preparation of rosin amine from a rosin acid is described in detail in U.S. Patent No. 2,491,913, wherein the method for converting the acid to the corresponding nitrile and subsequently reducing the nitrile to an amine is described. The stearate salt of rosin amine is prepared by reacting equal molal quantities of a rosin amine and stearic acid at a temperature elevated sufficiently to fluidize the stearic acid. Any rosin or modified rosin may be used in the preparation of the rosin amine stearate, suitable rosins including wood rosin, gum rosin or the pure acids, such as abietic or pimaric acids contained therein. Suitable modified rosins include polymerized rosin, heat-treated rosin, isomerized rosin, hydrogenated and dehydrogenated rosin or the pure acids derived therefrom such as dehydroabietic, dihydroabietic and tetrahydroabietic acids. The stearate of hydroabietylamine is ultimately derived from hydrogenated rosin which is prepared by contacting a natural rosin or rosin acid in fluid state with hydrogen in the presence of an active hydrogenation catalyst. The stearate of dehydrogenated (disproportionated) rosin amine is ultimately derived from the dehydrogenation of natural rosin with an active hydrogenation catalyst in the absence of hydrogen. The natural rosin, hydrogenated, dehydrogenated or other modified rosin may be refined by any appropriate means well-known to those skilled in the art prior to conversion to the amine.

The kaolin clay which we coat is in discrete form, usually having an equivalent spherical diameter with the range of from about 0.5 to 4.8 microns, although finer or somewhat coarser particles may be benefited by the coating. The clay may include lattice water or, if so desired, the clay may be calcined to eliminate at least portion of the lattice water. Ordinarily the free moisture of the coated clay should not be in excess of about 1%, free moisture being the water eliminated by heating the clay to essentially constant weight at 220° F., expressed on a percentage basis.

Our invention is not limited to any method for coating the clap since many methods may be employed successfully to accomplish the requisite coating. We may place the clay with a suitable quantity of rosin amine stearate in a hammer mill and mill until substantial homogenization is realized. Another method that we find particularly suitable is to fluid energy mill the clay and coating composition, preferably using steam as the fluid. A suitable temperature for fluid energy milling is within the range of from about 500–600° F.

In contradistinction to onium reacted montmorillonites, the modified clay of our invention is not truly organophilic and does not gel organic liquids, polar or nonpolar. However, the compatibility of the rosin amine stearate coated kaolin in organic media is improved over that of the kaolin precursor with respect to wettability and dispersibility whereby its utility therein as a primary pigment or extender pigment is enhanced substantially. Rosin amine stearate coated kaolin is characterized by a partially hydrophobic surface preferentially wet by organic systems and is generally repellent to water.

Since the terms "hydrophobic" and "organophilic" are not truly objective terms we prefer to characterize the surface properties of the unmodified and modified kaolin clay of our invention by a method in which the hydrophobic surface is taken to be the quantitative difference between the surface area of the clay with water vapor as the adsorbate and that measured with nitrogen. The surface area of the pigment is first determined by the B.E.T. method, using nitrogen as the adsorbate. Then the adsorption of water vapor is measured under conditions which result in the adsorption of a monolayer on a normally hydrophilic surface. We find, by this method, that the rosin amine stearate coated kaolin is characterized to a partially hydrophobic surface whereas the uncoated kaolin is completely nonhydrophobic. The exact value of the percentage hydrophobic surface of any surface-modified clay depends, of course, on the specific clay stock used, effectiveness in uniformly distributing the coating composition on the stock and, to some extent, on the percentage coating used. We have observed that when kaolin clay is coated with rosin amine stearate in amount within the range of from about 1% to about 2% (based on the weight of the clay) the measured percentage of hydrophobic surface is usually within the range of from about 38 to 49% (as compared with 0% for the uncoated stock). Organic coating vehicles in which our coated kaolin has outstanding wettability and dispersibility include: nonpolar liquids such as polybutene, mineral oil, kerosene, mineral spirits, gas oil, and polar liquids such as alkyd varnishes. Ordinarily the novel coated kaolin of our invention may be dispersed in organic liquid coating vehicles in loadings within the range of 10–60%, and particularly within the range of from about 25–55%. The term "loading" as herein used refers to the weight percentage of pigment in the compositions based on the total weight of the composition. At such levels the coated kaolin is useful as a primary or extender pigment (in the case of paints and protective coatings) and extender pigment in printing inks. The rosin amine stearate coated kaolin is particularly useful in relatively viscous printing inks employing polar and nonpolar vehicles, such as lithographic and letterpress inks. Therein they may be used in loadings ordinarily up to about 60%, although 45% loadings may be preferred. The coated clay may be used in lower loadings in more fluid inks, such as gravure ink, wherein their outstanding suspendibility in the vehicle (such as toluene) will indicate their use rather than that of uncoated kaolin clay.

Following are examples which are included only for purposes of contributing to a better understanding of the present invention and which are not to be interpreted as limiting the invention to the embodiments set forth therein.

EXAMPLE I

A sample of water-washed kaolin clay was taken from water-fractionated clay stock of an average equivalent spherical diameter of 0.5 micron and containing not more than 1% of moisture. To the sample was added 2% by weight of Rosin Amine D Stearate, the stearic acid salt of the amine of disproportionated rosin. The clay and amine mixture was milled in a steam jet mill at 600° F. and under 75 p.s.i.g. pressure.

The hydrophobicity of the resultant product as measured by the method hereinabove described was 46%.

EXAMPLE II

A sample of water-washed kaolin clay was weighed from water-fractionated clay stock of an average equivalent spherical diameter of 0.5 micron and containing not more than 1% of moisture. To the sample 1% by weight of Rosin Amine D Stearate was added and the mixture milled in a hammer mill for about an hour. The measured hydrophobicity of the coated kaolin clay was about 41%.

EXAMPLE III

This example illustrates the advantage of the rosin amine stearate coated kaolin over its uncoated counterpart with respect to settling rate in organic vehicles used in protective coatings. In this example various automotive primer compositions were provided utilizing various extender pigments. The grinding formula was:

| | Grams |
|---|---|
| Brown iron oxide | 150 |
| 50% alkyd solution | 178 |
| Mineral spirits | 118 |
| Extender pigment | 170 |

The above ingredients were weighed in the quart jar and the 500 gram load of grinding balls was added. The jars were then placed upon the Abbe roller mill which turned them at a speed of approximately 60 r.p.m. Pigment settling rates of the automotive primer formulations employing coated and uncoated kaolin were determined by the Patton pigment settling gage.

The Patton gage consists essentially of a tripod base supporting a central vertical tubular sleeve (carrying a graduated linear scale) through which runs a loose fitting plunger (1¼-in. diameter). The bottom end of the plunger is fitted with a thin flat disc (1½-in. diameter) which is perforated concentrically with four holes (¼-in. diameter). The upper end of the plunger is fitted with a pin on which weights can be placed to exert a driving action on the plunger and perforated disc. The gage provides for a systematic probing of the layering of pigment which may have settled to the bottom of a quart can of paint during a given time period. The perforated disc, which acts as the probe, is pushed down through the paint under a stepwise increase in loading, the increments being scheduled at half-minute intervals. The loading is continued until the disc touches and comes to rest on the bottom of the can or until the maximum loading of 1000 grams is reached with a layer of pigment present which resists displacement. The test was run on a quart sample of the test paint stored in a one quart commercial paint container, 4 inches in diameter and 4.5 inches in height.

The pigments employed in the tests are described in Table I.

*Table I*

| | Coating | Av. Eq. Spherical Dia., Microns |
|---|---|---|
| ASP-200 Kaolin clay | None | 0.55 |
| ASP-105 Kaolin clay | 2% RAS | 0.55 |
| ASP-900 Kaolin clay | None | 4.8 |
| ASP-905 Kaolin clay | 2% RAS | 4.8 |

The results of settling tests in which the pigments identified in Table I were used are reported in Table II.

The higher the reading on the settling gage, as reported in Table II, the more the settling and/or the harder the nature of the body of settled pigment. The results tabulated in Table II show the marked improvement in resistance to settling of the modified kaolin over its uncoated counterpart when dispersed in an alkyd vehicle.

*Table II.—Automotive primers—Pigment settling—Patton gage*

| Time, Minutes | Total Wt. Gram | Height in inches of perforated disc above bottom of can | | | |
|---|---|---|---|---|---|
| | | ASP-200 | ASP-105 | ASP-900 | ASP-905 |
| SERIES I [1] | | | | | |
| 0.5 | 100 | 2.35 | | 1.10 | 0.49 |
| 1.0 | 200 | 2.00 | | 0.80 | 0.23 |
| 1.5 | 400 | 1.20 | | 0.52 | 0.01 |
| 2.0 | 600 | 0.95 | | 0.34 | 0.00 |
| 2.5 | 800 | 0.80 | | 0.19 | 0.00 |
| 3.0 | 1,000 | 0.68 | | 0.07 | 0.00 |
| SERIES II [2] | | | | | |
| 0.5 | 100 | 1.70 | | 0.82 | 0.50 |
| 1.0 | 200 | 0.85 | | 0.62 | 0.45 |
| 1.5 | 400 | 0.58 | | 0.43 | 0.00 |
| 2.0 | 600 | 0.44 | | 0.30 | 0.00 |
| 2.5 | 800 | 0.34 | | 0.20 | 0.00 |
| 3.0 | 1,000 | 0.26 | | 0.11 | 0.00 |
| SERIES III [3] | | | | | |
| 0.5 | 100 | 1.06 | 0.42 | 0.34 | 0.33 |
| 1.0 | 200 | 0.36 | 0.20 | 0.22 | 0.07 |
| 1.5 | 400 | 0.15 | 0.10 | 0.11 | 0.00 |
| 2.0 | 600 | 0.06 | 0.00 | 0.03 | 0.00 |
| 2.5 | 800 | 0.00 | 0.00 | 0.00 | 0.00 |
| 3.0 | 1,000 | 0.00 | 0.00 | 0.00 | 0.00 |
| SERIES IV [4] | | | | | |
| 0.5 | 100 | 0.62 | 0.45 | 0.30 | 0.26 |
| 1.0 | 200 | 0.27 | 0.27 | 0.22 | 0.05 |
| 1.5 | 400 | 0.16 | 0.06 | 0.13 | 0.00 |
| 2.0 | 600 | 0.10 | 0.00 | 0.05 | 0.00 |
| 2.5 | 800 | 0.05 | 0.00 | 0.00 | 0.00 |
| 3.0 | 1,000 | 0.01 | 0.00 | 0.00 | 0.00 |

[1] Series I settled 52 days.
[2] Series II settled 52 days.
[3] Series III settled 35 days.
[4] Series IV settled 41 days.

EXAMPLE IV

Kaolin clay cannot be used as an extender pigment in lithographic ink, because inks thus extended emulsify when contacted with the fountain solutions used. This in turn leads to poor printing characteristics for the link and severe caking and bleeding results.

Unmodified kaolin clay and kaolin clay modified with 2% of rosin amine stearate were each tested for resistance to emulsification in a blue lithographic printing ink. The ink formulation used in these tests was as follows:

| | G. |
|---|---|
| Clay extender | 80 |
| Regular varnish No. 1 | 80 |
| Cobalt drier | 2 |
| CPC blue | 2 |

An appropriate quantity of this ink was placed in a Waring Blendor in the presence of water and agitated vigorously for 5 minutes. Substantial emulsification was evidenced when the uncoated clay was used as the extender, whereas clay coated with the rosin amine stearate produced substantially less emulsification. A clay coated with 2% of the acetate of a high molecular weight aliphatic hydrocarbon and a measured hydrophobicity of 55% was used as the extender and showed considerably more emulsification than did the rosin amine stearate coated clay.

EXAMPLE V

Several ink formulations were used to compare the behavior or coated and uncoated clays in lithographic inks. The initial formula was as follows:

|  | Grams |
|---|---|
| Extender pigment | 80 |
| Regular varnish #1 | 80 |
| Cobalt drier | 2 |
| Blue pigment | 2 |

The ink was premixed and then milled by three passes through a roller mill at 300 p.s.i.

The inks were printed on a multilith press, Meade "Moistrite" bond paper was used. The apparatus was housed in a room maintained at 72° F. and a relative humidity of 55%. Press speed was 5000 impressions per hour.

An ink extended with an extender of proved merit in lithographic inks, Multiflex MM (alumina hydrate) was used as a standard, and the inks including different extenders were run side by side with their prints contained on a single sheet of paper. The inks prepared were extended with water-washed kaolin (0.5 micron, average equivalent spherical diameter) and the same kaolin variously surface coated.

The uncoated kaolin extended ink bled severely during the run and tended to cake on the rolls, caking becoming progressively worse during the run. Ink extended with kaolin (0.5 micron) coated with 2% Rosin Amine D Stearate was markedly superior in print characteristics and press performance to the uncoated kaolin and to alumina hydrate.

EXAMPLE VI

In order to determine the caking tendencies of inks containing treated and untreated clays, inks including rosin amine stearate coated kaolin, untreated kaolin or alumina hydrate as extenders were distributed on the rollers of the Multilith inking system and run without printing for periods up to about eight hours using 6 micron films. The uncoated clay caked within 2 to 4 hours whereas the rosin amine stearate coated kaolin showed little tendency to cake during the interval. The rosin amine stearate coated kaolin was superior to alumina hydrate in this respect, the latter caking within one hour after the run began. The ink formulation was that of Example V.

The ability of an extender solid to be readily wet by a vehicle during premixing and easily dispersed with a minimum number of passes through a mill are highly desirable characteristics.

EXAMPLE VII

The dispersibility of the coated clay in a mineral spirit varnish was studied to evaluate the utility of the coated clay in a letterpress ink system. The varnish used was specified as ADM 50%, A–4–4–DEG. The resin was A–404 resin, a fumaric rosin adduct, and the vehicle had a viscosity of Z–2 Gardner Holdt. The varnish was milled with 45% weight percent of the extender pigment and milled under standard conditions, i.e., three passes at 300 p.s.i. The results tabulated in Table III below illustrate the superiority of dispersibility of rosin amine stearate coated kaolin over that of uncoated kaolin (0.5 micron average equivalent spherical diameter).

Table III.—Dispersion of clays in an M.S. varnish

| Coating | Surface Hydrophobicity | Premix, Min:Sec | Milling Time (sec.) | | | Fineness of Grind | | | Length |
|---|---|---|---|---|---|---|---|---|---|
| 2% RAS | 49 | 1:10 | 61 | 54 | 54 | 6 | 4 | 3 | 2 |
| 1% RAS | 41 | 1:15 | 59 | 61 | 69 | 8 | 4.5 | 2 | 2 |
| None | 0 | 1:20 | 60 | 57 | 56 | 8 | 4.5 | 4 | 2.3 |

The results indicate that the partially hydrophobic coating aids wetting of the clay by the vehicle as evidenced by low premix time. Furthermore, particularly in the case of the kaolin coated with 1% rosin amine stearate, dispersion is substantially improved.

EXAMPLE VIII

The dispersion study of Example VII was extended to the behavior of the coated and uncoated clays in a M.O. varnish having the following specifications:

22% helix, 6% limed rosin
23% W.W. resin
55% 561 Gulf Oil (100 S.U. at 100° F.)

The varnish had a viscosity of Z–4 Gardner-Holdt and an average acid value of 60. The results are tabulated below in Table IV.

Table IV.—Dispersion of clay in an M.O. limed rosin varnish

| Coating | Surface Hydrophobicity | Premix, Min:Sec | Milling, Time (sec.) | | | Fineness of Grind | | | Length |
|---|---|---|---|---|---|---|---|---|---|
| 2% RAS | 49 | 0.55 | 28 | 31 | 32 | 6.5 | 5 | 4.5 | 3 |
| 1% RAS | 41 | 1:00 | 28 | 31 | 33 | 7 | 6.5 | 5 | 3 |
| None | 0 | 1:00 | 26 | 28 | 29 | 9 | 8 | 7 | 2.5 |

The coated clay, particularly the 2% rosin amine stearate coated clay, showed low premix time, good milling characteristics and low grinds.

EXAMPLE IX

This example illustrates the improvement in dispersibility in mineral spirits of rosin amine stearate coated kaolin over the dispersibility of the uncoated kaolin in mineral spirits. The example also establishes that dispersion in mineral spirits of kaolin clay coated with rosin amine stearate prior to dispersion is superior to the dispersion of clay in the same media when a quantity of rosin amine stearate equivalent to that coated on the clay is added to the clay-mineral spirits systems prior to dispersion of the clay in the system.

In the example the uncoated clay used was ASP–100 and the coated clay was ASP–100 coated with 2%, based on the weight of the clay, of Rosin Amine D Stearate. ASP–100 is a grit-free water-washed kaolin of 0.5 micron average equivalent spherical diameter. The mineral spirits employed in the investigation was AMSCO mineral spirits.

A 0.98 gram sample of ASP–100 was weighed and added to 20 ml. of the mineral spirits in which 0.02 gram of Rosin Amine D Stearate had been dissolved. Another sample was prepared by adding 1.00 gram of the rosin amine stearate coated ASP–100 to another 20 ml. portion of the mineral spirits. One gram of ASP–100 was added to a third 20 ml. portion of the mineral spirits as a control. After shaking the three samples in 25 ml. stoppered cylinders for an equal time interval the contents of the cylinders were allowed to settle and their settling was recorded. The settling measurements as reported below in Table V were taken at 5 minute intervals for 20 minutes and recorded as milliliters of supernatant liquid. To check the possibility that adsorbed moisture might account for the poorer suspension of ASP–100 uncoated, a sample of ASP–100 was heated in a Despatch oven at 220° F. for an hour and tested as above in mineral spirits containing Rosin Amine D Stearate.

*Table V.—Suspension of clay in mineral spirits*

| Composition: | | | | |
|---|---|---|---|---|
| ASP-100 _____g__ | | 1.00 | 0.98 | |
| ASP-100, dried at 220° F____g__ | | | | 0.98 |
| ASP 100, coated with 2% RAS g__ | 1.00 | | | |
| Rosin Amine D Stearate____g__ | | | 0.02 | 0.02 |
| Mineral Spirits_____ml__ | 20.0 | 20.0 | 20.0 | 20.0 |
| Settling Data: | | | | |
| Original Volume, ml_____ | 20.1 | 20.0 | 20.0 | 20.5 |
| Supernatant Liquid, ml.: | | | | |
| 5 min_____ | 1.5 | 12.75 | 2.0 | 2.0 |
| 10 min_____ | 2.25 | 13.0 | 3.0 | 3.0 |
| 15 min_____ | 3.25 | 13.0 | 4.5 | 5.0 |
| 20 min_____ | 3.5 | 13.0 | 6.5 | 6.5 |
| Height of suspended solids after 20 min., percent of original_____ | 83.0 | 35.0 | 67.5 | 68.3 |

As shown in Table V, the sample of rosin amine stearate coated kaolin remained suspended for a longer period of time than did the sample including Rosin Amine D Stearate as a vehicle additive. The portion of the column still containing the coated kaolin in suspension at the end of a 20 minute interval was 83%, compared to 67.5% for the uncoated kaolin with the rosin amine stearate added to the vehicle. Both samples were superior to the control containing the uncoated kaolin in the absence of rosin amine stearate, the latter having settled until 35% of the column contained solids in suspension. Hence, although addition of the rosin amine stearate to the mineral spirits improved the suspendibility of the kaolin clay therein, nevertheless, the same quantity of rosin amine stearate used in pretreating the clay surface was considerably more effective.

In organic protective coatings rosin amine stearate treated kaolin clay has, in additon to ease of grinding and superior suspension properties in the paint, improved water resistance and adhesion of the film to metallic surfaces.

It will be understood that in coating compositions utilizing rosin amine stearate treated kaolin clay as an extender other pigments, plasticizers, stabilizers, etc., such as are well-known to those in the art, will be included in formulations where their use is indicated.

We claim:
1. Kaolin clay of improved dispersibility in liquid organic media containing from 0.5 to 5.0%, based on the weight of the clay, of rosin amine stearate coated on the surface thereof.
2. Kaolin clay of improved dispersibility in liquid organic media containing from 1.0 to 2.0%, based on the weight of the pigment, of rosin amine stearate coated on the surface thereof.
3. Kaolin clay of improved dispersibility in liquid organic media containing from 1.0 to 2.0%, based on the weight of the pigment, of the stearic acid salt of the amine of disproportionated rosin coated on the surface thereof.
4. Kaolin clay having coated on the surface thereof from 0.5 to 5.0% by weight of rosin amine stearate, said kaolin clay having a free moisture content not to exceed about 1%.
5. Kaolin clay having coated on the surface thereof from 1 to 2% by weight of rosin amine stearate, said kaolin clay having a free moisture content not to exceed about 1%.
6. A coating composition comprising an organic coating vehicle having dispersed therein from 10 to 60 percent by weight of kaolin clay pigment, said kaolin clay pigment being coated with from 0.5 to 5 percent, based on the weight of the clay, of rosin amine stearate.
7. The coating composition of claim 6 in which said organic coating vehicle is a lithographic varnish.

References Cited in the file of this patent
UNITED STATES PATENTS

| | | |
|---|---|---|
| 2,305,379 | Detrick et al. | Dec. 15, 1942 |
| 2,531,396 | Carter et al. | Nov. 28, 1950 |
| 2,531,427 | Hauser | Nov. 28, 1950 |
| 2,697,699 | Cohn | Dec. 21, 1954 |
| 2,739,069 | Fordyce et al. | Mar. 20, 1956 |
| 2,841,504 | Liggett | July 1, 1958 |
| 2,852,406 | Riegler et al. | Sept. 16, 1958 |